United States Patent [19]
French

[11] Patent Number: 5,548,163
[45] Date of Patent: Aug. 20, 1996

[54] DEVICE FOR SECURING CAR AUDIO EQUIPMENT

[75] Inventor: John B. French, Stouffville, Canada

[73] Assignee: Blade Technologies Inc., Markham, Canada

[21] Appl. No.: 165,612

[22] Filed: Dec. 13, 1993

[51] Int. Cl.$^6$ ................................................ B60R 25/00
[52] U.S. Cl. .................................. 307/10.2; 70/DIG. 46; 180/287; 340/825.32
[58] Field of Search ................................. 307/10.1–10.6; 180/287; 70/DIG. 46, 278, 267–269; 340/426, 430, 825.3–825.32, 825.34, 825.44, 825.45, 825.63; 455/343, 345, 346; 235/375, 380, 382, 382.5, 384

[56] References Cited

U.S. PATENT DOCUMENTS

| | | | |
|---|---|---|---|
| 4,232,291 | 11/1980 | Bernier | 307/10.5 |
| 4,288,778 | 9/1981 | Zucker | 307/10.5 |
| 4,383,242 | 5/1983 | Sassover et al. | 307/10.5 |
| 4,438,426 | 3/1984 | Adkins | 307/10.5 |
| 4,697,171 | 9/1987 | Suh | 307/10.5 |
| 4,868,409 | 9/1989 | Tanaka et al. | 307/10.5 |

OTHER PUBLICATIONS

Product Brochure for a Vehicle Protection System—The "Immobiliser"; Nov. 1992 QUORUM INTERNATIONAL, LTD.

*Primary Examiner*—William M. Shoop, Jr.
*Assistant Examiner*—Richard T. Elms
*Attorney, Agent, or Firm*—Bereskin & Parr

[57] ABSTRACT

A security device for use with audio and video equipment installed in an automobile or other type of vehicle, such as a van or boat. The security device includes a module which is coupled to the equipment to be protected. The security device comprises an encoded security key which is plugged into a key receptacle to disarm and arm the module. The key includes logic for producing an encoded disarming signal and is of a size which can be easily carried on the person of the user. The module can be located at a space in the vehicle which is remote to the key receptacle thereby allowing otherwise inaccessible equipment to be conveniently secured from the passenger compartment of the vehicle for example. Without a proper encoded key, the equipment cannot be operated and is virtually useless if removed from the vehicle. To provide a further deterrent to theft, the module and/or equipment include a warning notice signifying the inoperative nature of the equipment without the key.

13 Claims, 12 Drawing Sheets

DEVICE FOR SECURING CAR AUDIO EQUIPMENT

FIELD OF THE INVENTION

The present invention relates to a security device. More particularly, the present invention relates to a security device for use with audio or video equipment in an automobile or other types of vehicles.

BACKGROUND OF THE INVENTION

Modern high performance car audio equipment typically comprises a head-unit, i.e. tuner/receiver and cassette (or compact disk player for example) and one or power amplifiers. It is common to install the power amplifier(s) in a remote or inaccessible location such as the trunk. Due to the high cost of a system, car audio equipment becomes an attractive target for theft. Theft of car audio equipment has become a growing concern.

In an attempt to thwart car audio theft, various security devices have been introduced. One known device comprises using a removable mount for the audio equipment. When the automobile is to be unattended, the owner removes the car stereo from the passenger compartment and locks it in the trunk. Because the trunk can be locked, the stereo equipment can be protected. While a locked trunk will deter some thieves, if the trunk is forced open, the equipment will be lost. Since it can be inconvenient, the owner may not always remove and lock the stereo equipment in the trunk, and therefore the equipment is vulnerable to be stolen. If the vehicle is a hatchback, then security of the equipment is further compromised.

Another device involves equipping the audio component with a removable face-plate. The face-plate includes the controls for the component, e.g. power on/off, volume, tuner, and without the faceplate, the component is virtually inoperable. While this approach can serve as a deterrent, the owner experiences the inconvenience of carrying around a face-plate which can be bulky.

The prior art also teaches an electronic lock-out security device. The electronic lock-out is incorporated in the head unit so that when power is removed, i.e. the head-unit is unplugged, the lock-out device must be reprogrammed according to a specified sequence to re-enable the head unit. While a programmed code can provide a degree of security, it can also be inconvenient for the user to reprogram the head-unit.

Accordingly, there is a need for a security device which can conveniently secure the stereo equipment and also deter a would-be thief from stealing it.

BRIEF SUMMARY OF THE INVENTION

In a first aspect, the present invention provides a security device for use with audio and visual equipment mounted in a vehicle, said security device comprising: (a) securing means coupled to the equipment to be protected and having means for disabling operation of the equipment; (b) security control means for disarming said securing means and enabling operation of the equipment, said security control means being located in a space in the vehicle which is remote from said securing means; (c) said security control means including a key having circuit means for producing an encoded security signal and said securing means including means for reading and responding to said encoded security signal for enabling operation of the equipment; and (d) coupling means for coupling said security control means to said securing means.

In a second aspect, the present invention provides a security device for use with electronic equipment adapted for use with a power supply, said security device comprising: (a) securing means coupled to the equipment to be protected and having disabling means for disabling operation of the equipment until said securing means are disarmed; (b) said securing means including means responsive to an interruption in the power supply and activating said disabling means in response to an interruption in the power supply; (c) security control means for disarming said securing means and enabling operation of the equipment while the equipment is receiving power; and (d) said security control means including a key having circuit means for producing an encoded security signal and said securing means including means for reading and responding to said encoded security signal for disarming said securing means.

In a third aspect, the present invention provides a security key for use with a security device for securing audio and video equipment, said security key comprising: (a) circuit means for producing an encoded security signal; (b) the security device including means for reading and responding to said encoded security signal for enabling operation of the equipment to be protected; and (c) said circuit means including a pulse width modulator and said encoded security signal is a pulse width modulated signal having a predetermined duty cycle.

BRIEF DESCRIPTION OF THE DRAWINGS

For a better understanding of the present invention, and to show more clearly how it may be carried into effect, reference will now be made, by way of example, to the accompanying drawings which show preferred embodiments of the present invention, and in which.

DETAILED DESCRIPTION OF THE PREFERRED EMBODIMENTS

Figure 1:
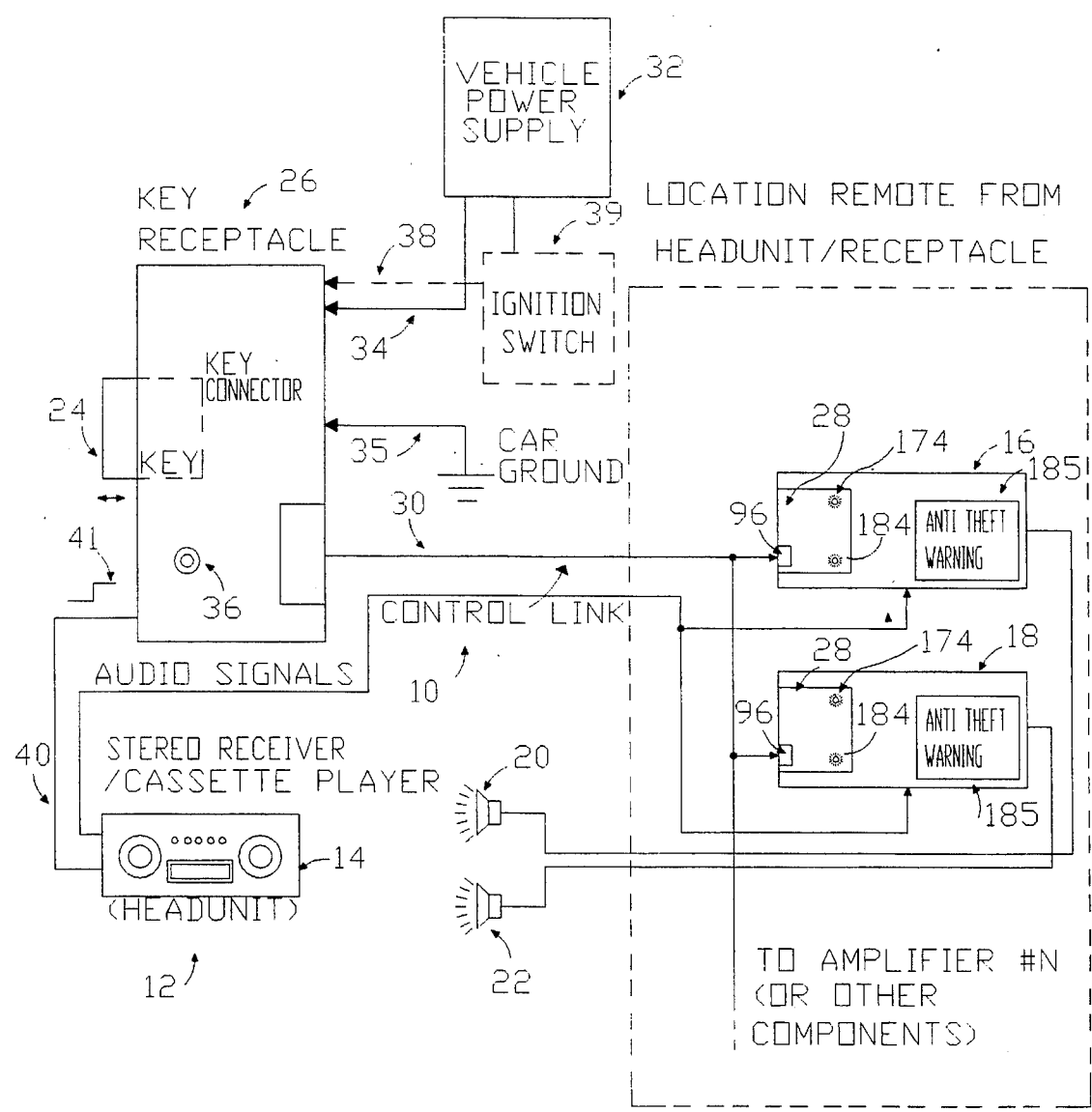
FIG. 1 is a block diagram showing a security device according to the invention for securing audio or video equipment in a vehicle.

Reference is first made to FIG. 1 which shows a security system 10 according to the present invention. The security system 10 will be described in the context of a car audio system, but the system 10 is suitable for use with audio (or video systems) in other vehicles, for example vans, trucks and boats.

Figure 10:
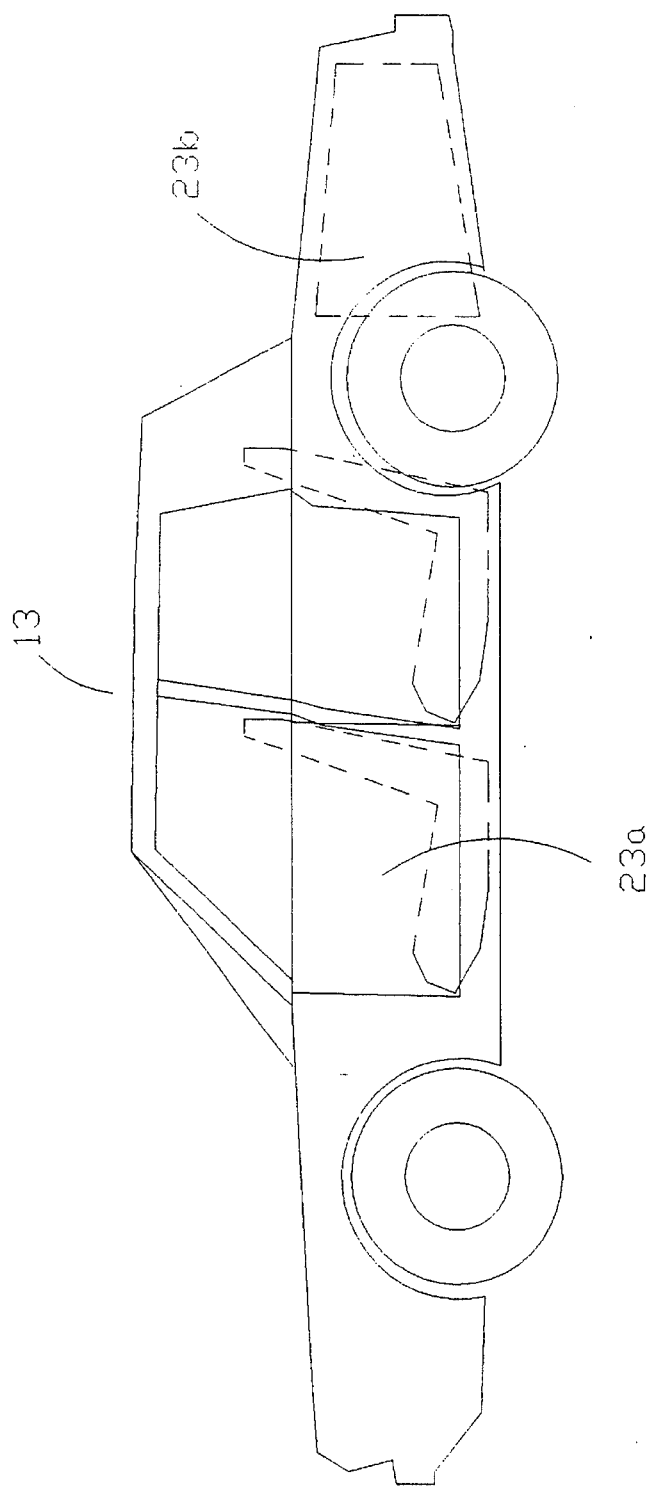
FIG. 10 is a diagrammatic view of an automobile with which the invention may be used.

As shown in FIGS. 1 and 10, the security device 10 is used with an audio system 12 for an automobile 13 comprising a stereo receiver/cassette player 14, two (left and right channel) power amplifiers 16,18 and two audio speakers 20,22. The stereo receiver 14 ("head-unit") is located in the passenger compartment 23a of the automobile. The receiver/cassette player 14 uses the power amplifiers 16,18 to drive the speakers 20,22. Typically, the power amplifiers 16,18 are mounted in location remote from the head-unit, for example the trunk 23b of the automobile or under the seats in a truck, for example.

The security device 10 comprises a security key 24, a key receptacle 26 and security module 28. The security key 24 plugs into the receptacle 26 and "disarms" the audio system 10 as will be described below. (In another embodiment of the invention, the security key 24' can be used to both "disarm" and "arm" the device 10 as will be described below with respect to FIG. 6.) The key receptacle 26 is located in a convenient location in the passenger compartment 23a of the car. The key receptacle 26 is coupled to the security module 28 through a control link 30. The security module 28 is coupled to the audio equipment and can be manufactured as an integral component of the audio equipment to be protected, for example, power amplifiers 16,18, as depicted in FIG. 1. However, there may be applications where it is desirable to manufacture the security module 28 as a separate component which is coupled to the equipment, e.g. the amplifiers 16 and 18.

The power amplifiers 16,18 are usually mounted in a remote location, for example in the trunk 23b of the automobile. The security module 28 is used to enable and disable the power amplifiers 16,18. A feature the security system 12 is that audio equipment, e.g. the power amplifiers 16,18, which are normally mounted in a remote location can be enabled and disabled from the key receptacle 26 which can be mounted in a convenient location such as the passenger compartment.

Figure 2:
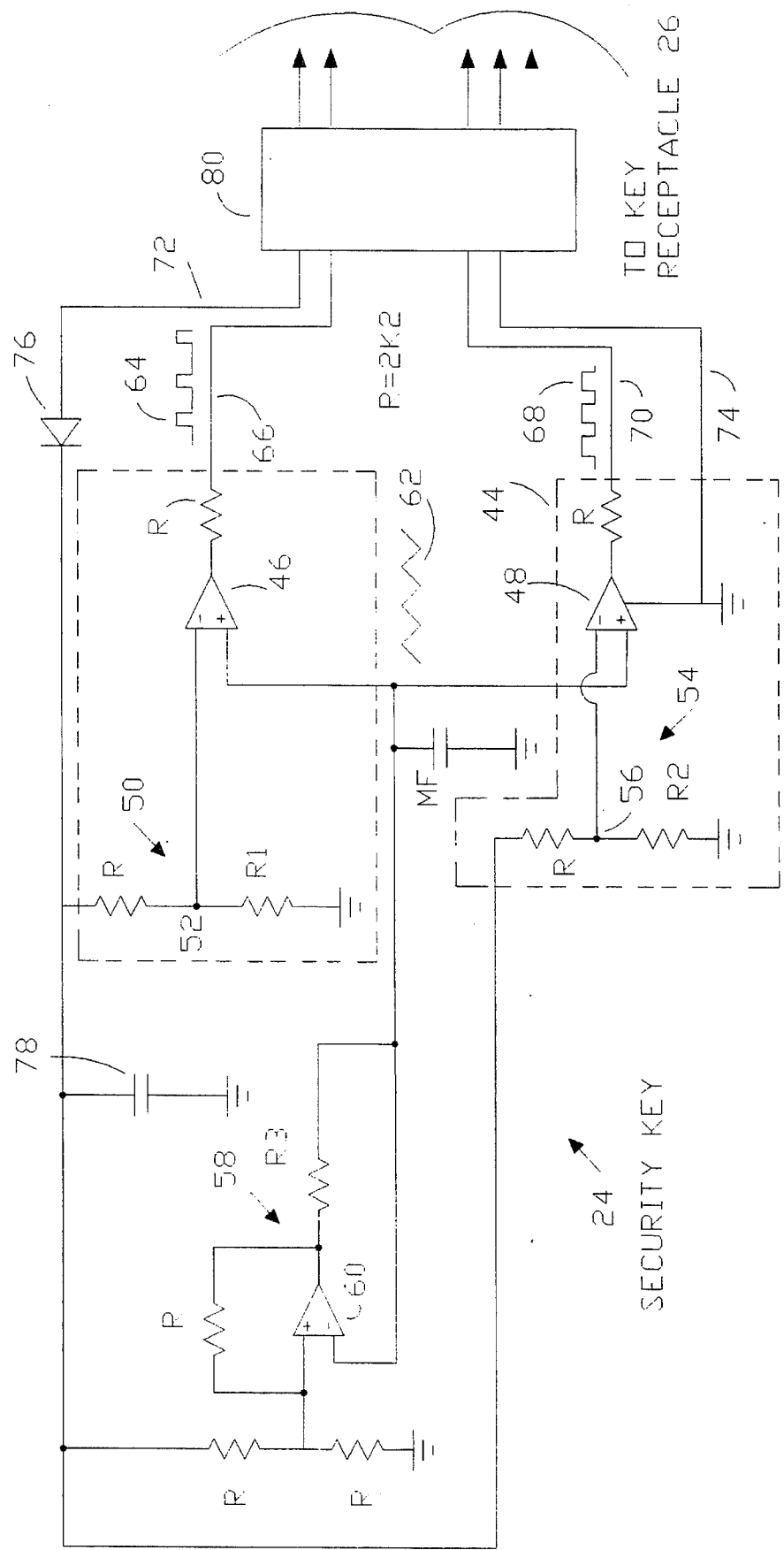
FIG. 2 is a schematic diagram showing in detail a security key for the security device of FIG. 1.

The key receptacle 26 is coupled to a power supply 32, which in automobile comprises a 12-volt supply. In an automobile, the power supply 32 can provide a constant 12-volt feed or a switched 12-volt feed which is controlled by the ignition switch. As shown in FIG. 2, the key receptacle 26 is supplied by a constant 12-volt feed 34. The key receptacle 26 also includes a switch 36, which is mounted so that it is easily accessible by the user. The switch 36 can be used to "arm" the security device 10, which disables the power amplifiers 16,18, as will be described below.

In another embodiment, the key receptacle 26 (and security device 10) is powered by a switched 12-volt feed 38 (shown using a broken line). The switched 12-volt feed 38 is controlled by the automobile ignition switch which is shown as a switch 39. In this embodiment, the ignition switch 39 is used to "arm" the security device 10 as will be described below.

The security device 10 also includes a remote power-on input 40 for a remote power-on signal 41 which is coupled to the key receptacle 26. The remote power-on signal 41 is generated by the head-unit 14 and is used to turn on/off the amplifiers 16,18 or other components, for example, a graphic equalizer (not shown). As will be described below, the security device 10 "gates" the remote power-on signal 41 and disables operation of the amplifiers 16,18 if a valid security key 24 is not used or available. Therefore, the amplifier 16 or 18 is virtually useless without the appropriate security key 24.

The security key 24, key receptacle 26 and security module 28 and the operation of the security device 10 will now be described with reference to FIGS. 2 to 4.

Reference is made to FIG. 2 which is a schematic diagram of the security key 24. The security key 24 comprises a compact electronic circuit which can be mounted on a small printed circuit board (PCB) to provide a "smart card" which is used to "disarm" the security device 10, i.e. enable the power amplifiers 16,18 and allow normal operation of the car audio system 12. A feature of the present invention is that the power amplifiers 16,18 are inoperable without the key 24. Thus, if owner takes the removes the key 24 and keeps it on their person, the power amplifier 16 is rendered useless even if it is stolen. As will be described below, this feature combined with a warning indicator can provide a powerful deterrent to theft because there is little economic value in audio equipment which is inoperable. Furthermore, the capability to disable and enable the power amplifier 16,18 from a remote location, i.e. the passenger compartment, makes it convenient for the owner to arm the security device 10 before leaving the car unattended. This is especially useful since components, e.g. the power amplifiers 16,18, of the car audio system 12 are usually located inaccessible areas (e.g. the trunk or underneath a seat) of the car or other vehicle.

As shown in FIG. 2, the security key 24 includes a pair of pulse width modulators (PWMs) 42,44. Each of the pulse width modulators 42,44 comprise a comparator 46,48. The inverting input of the comparator 46 is connected to a resistive divider 50 comprising a resistor R and resistor $R_2$ which produce a voltage reference signal at node 52. The inverting input of comparator 48 is connected to another resistive divider 54 comprising another resistor R and a resistor $R_2$ which produce a voltage reference signal at node 56. The non-inverting input of each of the comparators 42,44 is connected to the output of a triangular-wave generator 58. The triangular-wave generator 58 comprises an operational amplifier 60 which is configured as shown to generate a triangular waveform 62 as will be within the understanding of one skilled in the art.

Referring still to FIG. 2, the pulse width modulator 42 produces a pwm signal 64 on output 66. As is conventional and as shown in FIG. 2, the pwm signal consists of a series of highs and lows with a series of transitions between them. The duty cycle of the pwm signal 64 is determined or programmed by the resistor $R_1$. Similarly, the other pulse width modulator 44 produces a pwm signal 68 at output 70 and the duty cycle of the pwm signal 68 is determined by the value of resistor $R_2$. Each of the outputs 66,70 can including a resistor R to limit the output current and provide protection. The pwm signals 64,68 are taken with respect a signal ground or reference 74 which is coupled to the car ground 35 (FIG. 1) to complete the electrical loop. It will appreciated to one skilled in the art that the programming resistors $R_1$, $R_2$ provide many possible combinations for encoding the pwm signals 64,68.

The security key 24 is powered by the vehicle power supply 32. The key 24 includes a power input line 72 which is connected to the constant 12-volt feed 34. The reference input 74 is connected to the car ground 35 (FIG. 1) when the security key 24 is plugged into the key receptacle 26. The power input line 72 includes a diode 76 to protect against damage from polarity reversal and a decoupling capacitor 78 to catch "spikes" which may appear on the line 72.

As described above, the circuit for the security key 24 can be fabricated on a small and compact printed circuit (not shown). Because of its small size, the security key 24 can be easily carried on the person of the owner when away from the car, for example attached to a key chain (not shown). The security key 24 includes a connector 80 for coupling the pwm output lines 66,70 and power lines 72,74 to a mating connector (see below) where the security key 24 is plugged in the key receptacle 26. To discourage the disassembly of the security key 24, the entire circuit (i.e. the pwms 42,44, the programming resistors $R_1$, $R_2$ and the triangular-wave generator 58) can be encapsulated in an opaque epoxy resin which can be moulded to an appropriate ergonomic shape that is suitable for use with a key chain (not shown).

Figure 3:
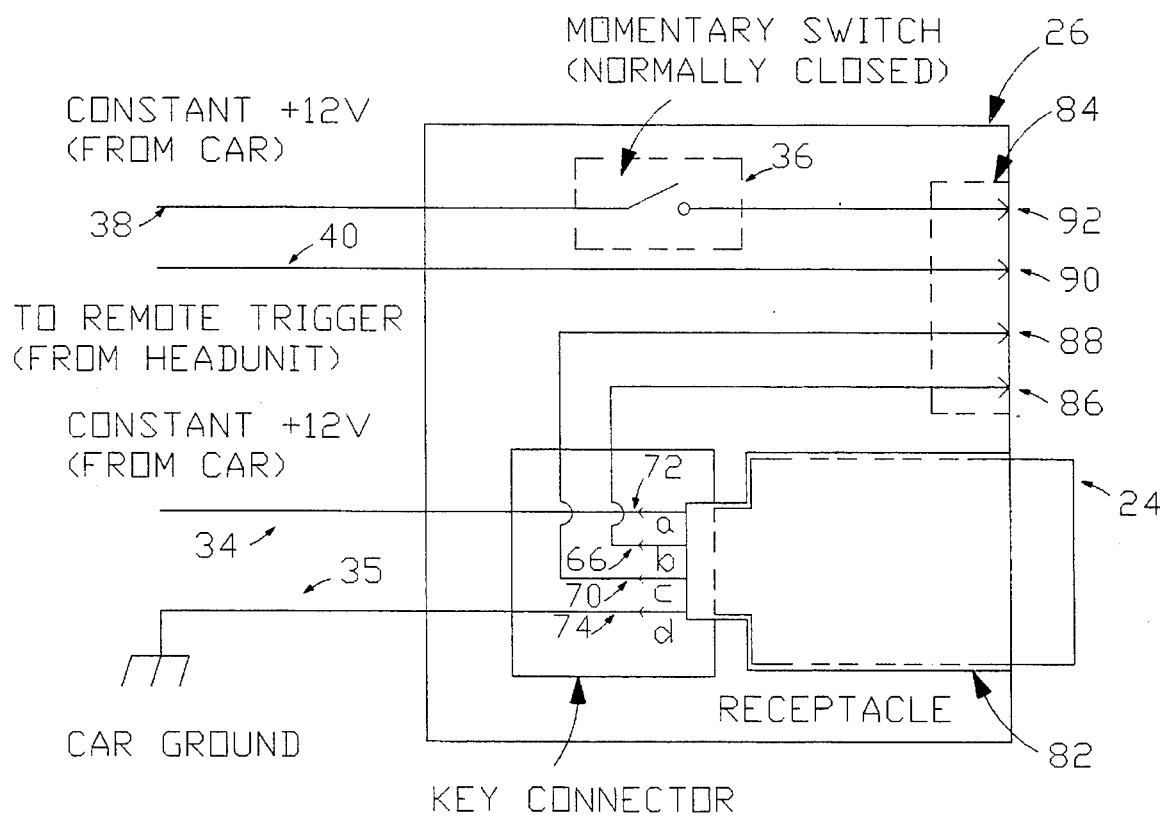
FIG. 3 is a schematic diagram showing in detail a key receptacle for the security device of FIG. 1.

Reference is next made to FIG. 3 which shows the key receptacle 26 in more detail. The key receptacle 26 includes a slot or port 82 into which the security key 24 is plugged. The slot 82 includes a connector 84 which mates with the connector 80 on the key 24. The connector 84 couples the security key 24 to the constant 12-volt power feed 34 and to car ground 35. The key receptacle 26 includes a control output port 84 which is used to control the security module 28 through the control link 30. For convenience, the key receptacle 26 can be located close to the ignition switch 39 or the head-unit 14 (FIG. 1).

As shown in FIG. 3, the control port 84 has four outputs 86,88,90,92 which are connected to the control link 30. The control link 30 can comprise a simple 4-wire link or more sophisticated communication link, for example, optically or acoustically encoded pwm signals 64,68. The first and second outputs 86,88 are connected to the pwm signal outputs 66,70 from the security key 24. The third output 90 couples the remote power on input 40 to the security module 28. The fourth output 92 provides the security module 28 with a latched voltage signal $V_1$ (FIG. 4) which is derived from the constant 12-volt supply feed 34. The latched voltage signal $V_1$ (FIG. 4) comprises the constant 12-volt supply feed 34 which can be interrupted by the momentary (normally closed) switch 36. The momentary switch 94 can be mounted on the faceplate of the key receptacle as shown in FIG. 1. As will be described below, the latched voltage signal $V_1$ can be used to "arm" the security device 10.

The control port 84 can also include appropriate buffers (not shown) on the output lines 86,88,90,92 to maintain the integrity of the signals on the control link 30.

In another embodiment of the invention, the fourth output 92 can be connected to the switched 12-volt supply feed 38 and the ignition switch 39 (FIG. 1) is used to "arm" the security device 10, as will be described below.

Figure 4A:
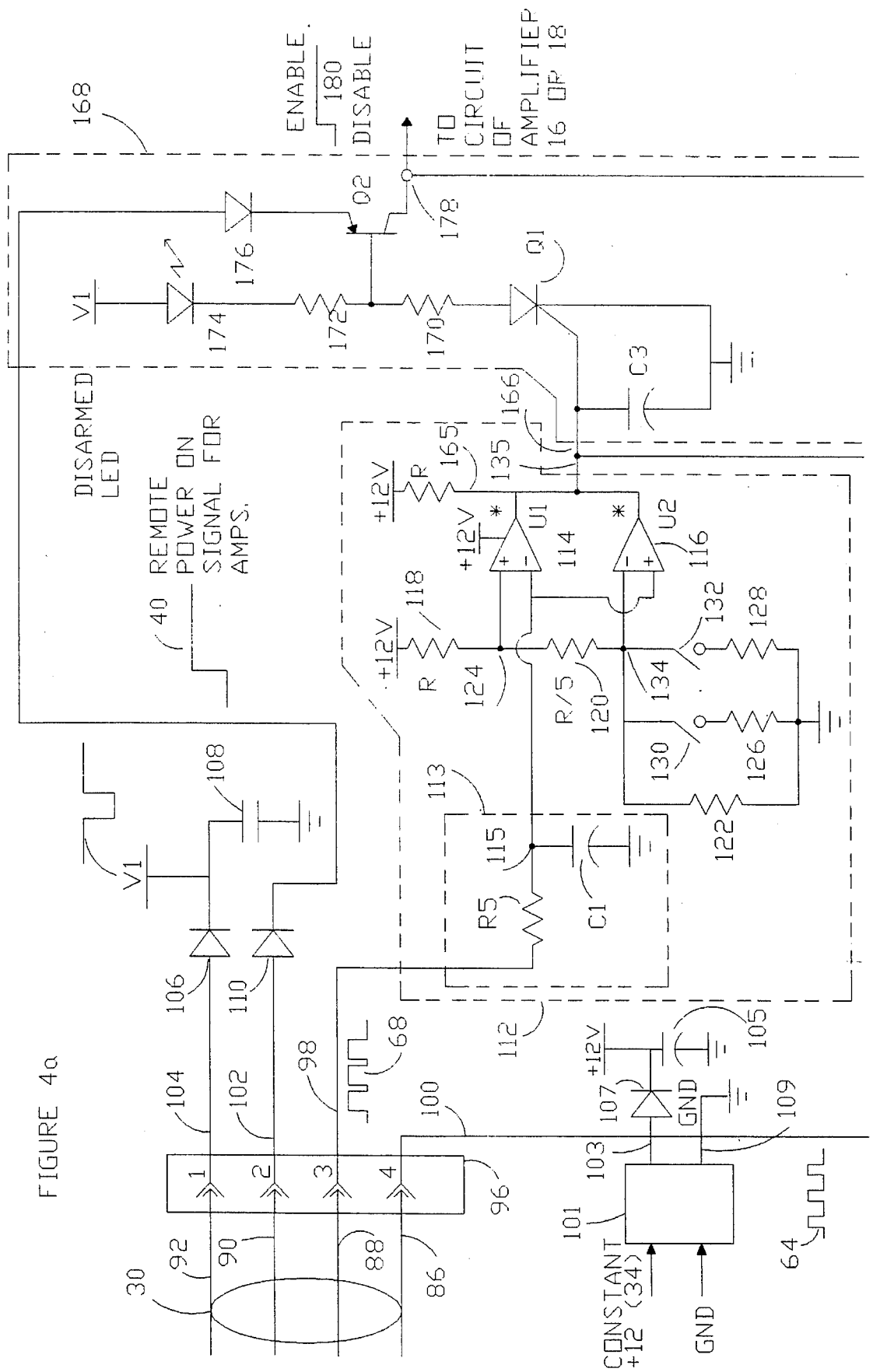
FIG. 4 is a schematic diagram showing in detail a security module for the security device of FIG. 1.
Figure 4B:
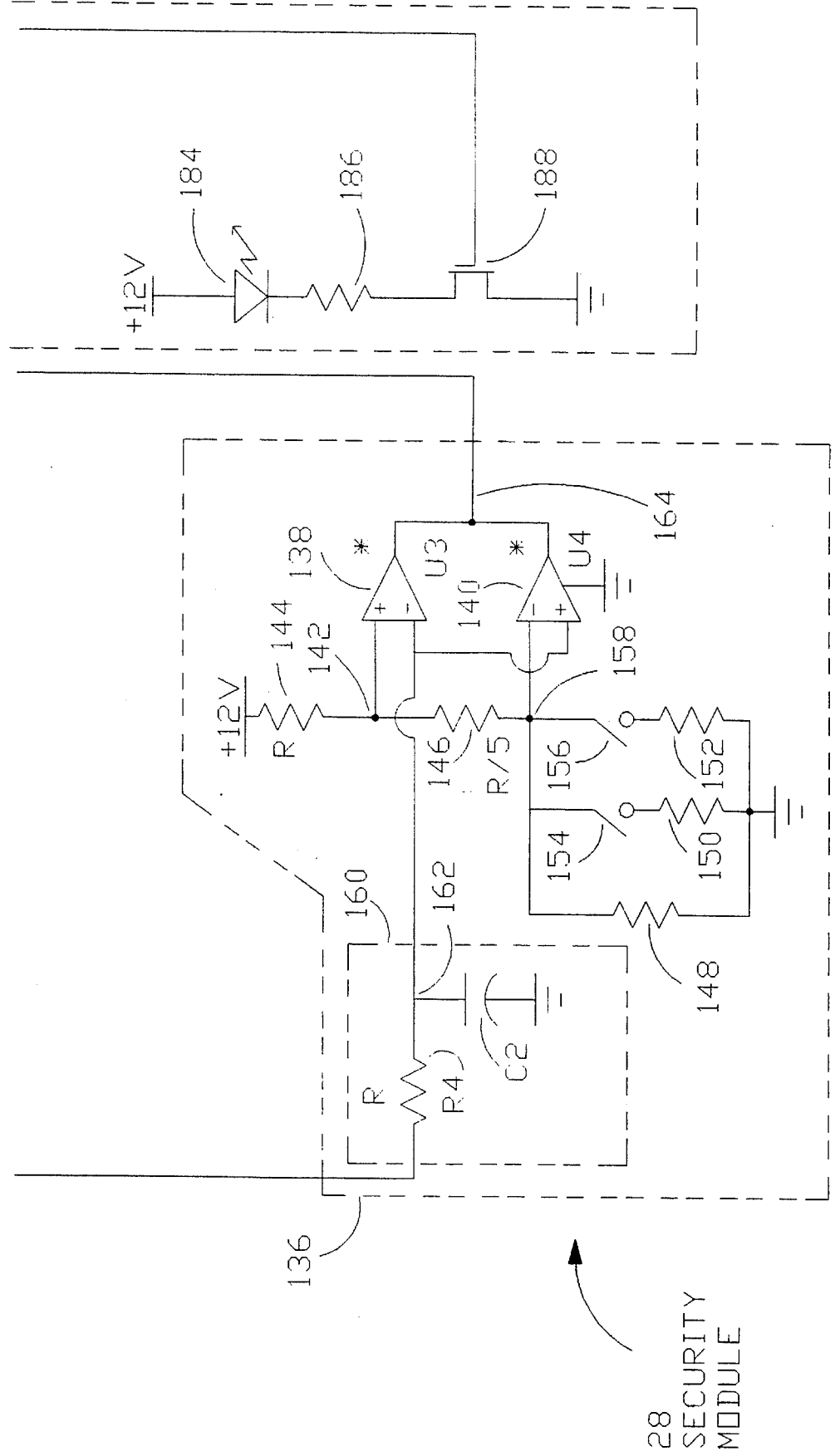

Reference is next made to FIG. 4 which is a schematic diagram for implementing the security module 28. While the security module 28 can be manufactured on a separate printed circuit board (PCB) (not shown), the module 28 is an integral component of the amplifier 16 (or 18) as is mounted inside the housing (not shown) of the amplifier 16 (or 18). As will be described in detail below, the security module 28 intercepts the remote power-on signal 41 (which would normally go directly to an amplifier circuit (not shown) in the amplifiers 16 and 18) and produces an amplifier enable signal in response to a valid security key 24 being inserted into the key receptacle 26. In other words, the function of the security module 28 is to disable and enable the power amplifier(s) 16 (18) by "gating" the remote power-on signal 41 for each amplifier 16 and 18 in response to signals on the control link 30.

As shown in FIG. 4, the security module 28 includes an input port 96 which is connected through the control link 30 to the output port 84 on the key receptacle 26. The input port 96 has four input lines 98,100,102,104 which connect to the respective pwm signal outputs 86,88 and remote power-on 90 and latched voltage 92 lines on the output port 84 of the key receptacle 26. Where it is desired to secure more than one component, e.g. amplifiers 16 and 18, using a single key 24 (and receptacle 26), the control link 30 is merely routed to each of the amplifiers 16,18 and plugged into the respective input 96.

As shown in FIG. 4, the latched voltage input line 104 provides an input for the latched voltage $V_1$ which, as will be described below, is used to "arm" the device 10 and i.e. disable the power amplifiers 16,18. The latched voltage input line 104 includes a diode 106 to protect the circuit in the security module 28 against damage from a reversed polarity. (This is important for automobiles (and other vehicles) where it relatively easy to reverse the connections to the car battery.) The latched voltage input line 104 also includes a capacitor 108 for filtering spikes which may be present in the latching voltage signal $V_1$ and thereby preventing accidental arming of the device 10. The remote power-on input line 102 also includes a blocking diode 110.

As shown in FIG. 4, the security module 28 also includes a power input port 101. The power input port 101 is used to provide power to the security module 28 and includes an input 103 coupled to the constant +12 volt power feed 34 (FIG. 1) which provides a supply rail +12 V for powering the circuit elements as indicated. The input 103 includes a capacitor 105 for decoupling or smoothing the power supply feed 34 and also a diode 107 to provide protection against a polarity reversal. The power input port 101 also includes an input 109 which is connected to car ground 35 (FIG. 1) and provides a reference or ground rail for the security module 28.

Referring to FIG. 4, the pwm input line 98 is coupled to a first window comparator shown in broken chain outline and indicated by reference 112. The pwm input line 98 feeds the pwm signal 68 (FIG. 2) into the window comparator 112. The window comparator includes first and second comparators 114,116. The first comparator 114 provides the upper threshold or limit for the "window" and the second comparator 116 provides the lower limit for the window. The window comparator 112 will produce a logic one output if the input is within the upper and lower limits.

As shown in FIG. 4, the input to the window comparator 112 includes a RC network 113 comprising a resistor $R_5$ and a capacitor $C_1$. The RC network 113 takes the average of the pwm signal 68 and produces a voltage signal at node 115 which is applied to the inverting input of the first comparator 114 and the non-inverting input of the second comparator 116. The upper limit for the window comparator 112 is set by a resistive divider formed from three series connected resistors 118,120,122. The resistive divider produces a voltage level (corresponding to the upper limit) at node 124 which is fed to the non-inverting input of the first comparator 114. The first resistor 118 has a resistance value R and the second resistor 120 is selected to have a resistance value R/5. The value of the third resistor 122, on the other hand, can be changed by two resistors 126,128 which can be connected in parallel using respective switches 130,132. As shown in FIG. 4, the third resistor 122 (and selectable resistors 126,128) produce a voltage level at node 134 which defines the lower limit for the window comparator 112. The voltage level at node 134 is coupled to the inverting input of the second comparator 116. If the average of the pwm signal 68 (FIG. 2) produced by the RC network 113 at node 115 is within the upper and lower limits, then the window comparator 112 produces a logic one at output 137.

As shown in FIG. 4, the other pwm input line 100 is coupled to a second window comparator 136. The structure of the second window comparator 136 is virtually identical to the first window comparator 112 described above. The window comparator 136 includes a first comparator 138 which determines the upper limit or threshold for the "window", and a second comparator 140 which determines the lower limit. The upper threshold is set at node 142 by a resistive divider comprising three resistors 144,146,148. The value of the third resistor 148 can be programmed by selecting two additional resistors 150,152 using respective switches 154,156. The third resistor 148 and resistors 150, 152 are used to define the lower limit at node 158 which is connected to the inverting input of the second comparator 140.

The input to the second comparator 136 also includes a RC network 160 comprising resistor $R_4$ and capacitor $C_2$. The RC network 160 takes the average of the pwm signal 64 (FIG. 2) and produces a voltage signal at node 162 which is connected to the inverting input of the first comparator 138 and the non-inverting input of the second comparator 140. If the average of the pwm signal 64 is within the upper and lower limits, then the window comparator 136 will produce a logic one on output 164.

It will be appreciated that the switches 130,132,154,156 allow for the programmability of the respective voltage limits for the first and second window comparators 112,136. The switches 130,132,154,156 can be conveniently implemented using a known "4-pole" DIP switch (not shown). Furthermore, the RC networks 113,160 and the pwm resistors $R_2,R_3$ in the key 24 (FIG. 2) provide additional flexibility for producing many unique encoded keys 24 and security modules 28. In addition, the pwm modulators 42,44 provide a level of complexity which makes the reverse engineering of a key 24 even more difficult.

The comparators 114,116,138,140 are of the "open-collector" type and a pull-up resistor 165 "pulls" the outputs to the voltage supply rail +12 Volts. The open-collector configuration allows the output 164 of the second comparator 136 to be "tied" to the output 135 of the first comparator 112 to form an "ANDed" output 166, as shown in FIG. 4. By tying the two outputs 135,164 together, a logical "AND" function is produced between the outputs of the window comparators 112,136.

The "ANDed" output 166 is coupled to a silicon controlled rectifier (or SCR) indicated by reference $Q_1$. The SCR $Q_1$, which is also known in the art as a reverse blocking triode thyristor, is a device in which the forward anode-cathode current is controlled by means of a control signal applied to the gate. As shown in FIG. 4, the "ANDed" output 166 is coupled to the gate of the SCR $Q_1$. When the average of each the pwm signals 64,68 (FIG. 2) is within the limits of the respective comparators 112,136, the output 166 will be high and cause the SCR $Q_1$ to turn on. The SCR $Q_1$ is part of an amplifier enable stage 168 which is indicated a broken chain outline in FIG. 4.

The gate of the SCR $Q_1$ is also coupled to a capacitor $C_3$, as shown in FIG. 4. The purpose of the capacitor $C_3$ is to filter the output 166 and remove any "glitches or spikes" which could accidentally trigger the SCR $Q_1$. In addition, the capacitor $C_3$ could be used to provide a delay, as will be described below with respect to another embodiment of the present invention.

As shown in FIG. 4, the anode of the SCR $Q_1$ is coupled (through a resistor 170) to the base of a transistor $Q_2$. The base of the transistor $Q_2$ is also connected to another resistor 172 which is connected to a light emitting diode (LED) 174. The resistor 172 limits the current through the LED 174 and the other resistor 170 limits the current through the SCR $Q_1$. The value of the resistor 170 is selected so that the SCR $Q_1$ is protected and the base of transistor $Q_2$ can also be pulled down sufficiently to turn on transistor $Q_2$.

The emitter of transistor $Q_2$ is connected to a diode 176, the anode of which is connected to the diode 110 (and remote power-on input 102). The purpose of the diode 176 is to provide a level shift for the remote power-on signal 41 and thereby prevent accidental latching or turning-on of the SCR $Q_1$. The collector of transistor $Q_2$ provides an output terminal 178 for an amplifier enable/disable signal 180 (which effectively replaces the remote power-on signal 41 generated by the head-unit 14). Like the power-on signal 41 produced by the head-unit 14, the enable/disable signal 180 is also an active high signal which enables, i.e. turns on, the amplifier 16. The collector of transistor $Q_2$ is connected to a remote power-on input 182 on the amplifier 16 or 18.

To allow for "daisy-chaining" of multiple amplifiers 16 and 18, the control link 30 at the amplifier end is merely split and plugged into the input port 96 for each amplifier 16. This allows an number of audio components, e.g. amplifiers 16,18 and a video component (not shown), to be protected using a single security key 24. For convenience, the input port 96 and termination on the control link 30 can be implemented using known telephone type jacks, for example.

Referring again to FIG. 4, the function of the LED 174 is to indicate that the security device 10 is in a "disarmed state". When in the disarmed state, the amplifiers 16,18 are enabled and in operation. The LED 174 is typically mounted on a visible panel of the housing (FIG. 1) for the amplifier 28. As shown in FIG. 4, the security module 28 (or amplifier 16) includes another LED 184, which indicates when the security device 10 is in an "armed or anti-theft state". This LED 184 can be used in conjunction with a "warning or anti-theft notice" 185 (FIG. 1) to provide a deterrent to stealing the amplifier 16. The "warning notice" 185 (FIG. 1) can indicate that the amplifier 16 is inoperable and therefore useless without the key 24. Thus there is little incentive to steal the amplifier because its resale value would be low. The "anti-theft" notice 185 can be affixed directly to the housing of the amplifier 16 and 18 (FIG. 1). In addition, one or more "anti-theft" notices 185 can be affixed to other areas of the vehicle which are clearly visible, for example, the rear windshield or bumper.

As shown in FIG. 4, the anode of the LED 184 is coupled to the voltage supply rail $V_1$. The cathode of the LED 184 is connected to a resistor 186 which limits the current in the LED 184 during forward bias. The state of the LED 184 is controlled by a junction field effect transistor (or JFET) 188. The JFET 188 is a depletion mode type device which is readily within the understanding of those skilled in art. The cathode of the LED 184 is coupled (through the resistor 186) to the source of the JFET 188 and the gate of the JFET is connected to the collector of transistor $Q_2$. As will be described below, the LED 184 will be on, i.e. signifying the "armed state", when the SCR $Q_1$ is off or not latched. On the other hand, when the SCR $Q_1$ is on, the output of the transistor $Q_2$ will be high and produce a voltage on the gate of the JFET 188 which will turn off the JFET 188 and therefore the LED 184. It will be appreciated by a person skilled in the art that the gate of the JFET 188 produces minimal loading.

In operation, when the key 24 is inserted into the key receptacle 26, the pwm signals 64,68 are transmitted to the security module 28 via the control link 30. The RC networks 113,160 take the average of the respective pwm signals 64,68 and recover voltage signals (at nodes 115 and 162 respectively) which are proportional to the +programming resistors $R_1$ and $R_2$ in the security key 24. The voltages at nodes 115 and 162 are compared by the window comparators 112 and 136 to the respective threshold levels (as programmed using the selectable resistors 126,128,150, 152). If the voltage signal at each node 115 and 162 is within the range of the respective window comparator 112 and 136, then the "ANDed" output 66 (which is tied to the gate of the SCR $Q_1$) will go high. This causes the SCR $Q_1$ to turn-on or "latch". With the SCR $Q_1$ latched, the transistor $Q_2$ will be turned on by the remote power-on signal 41 (which is generated when the head-unit 14 is turned on). This causes the output (i.e. collector) of the transistor $Q_2$ to go high which disarms the security device 10 and enables operation of the power amplifier 16. When the SCR $Q_1$ and transistor $Q_2$ are turned on, the "armed" LED 184 is turned off and the "disarmed" green LED 174 is turned on to provide a visual indication that the security device 10 has been disarmed. As will be described below in another embodiment of the present invention, the key 24 itself includes a LED (FIG. 6) for indicating the "disarmed" state.

To "arm" the security device 10, i.e. disable operation of the amplifiers 16,18, the SCR $Q_1$ is "unlatched". For the security module 28 shown in FIG. 4, the SCR $Q_1$ can be "unlatched" by removing the key 24 (from the receptacle 26, if not already done so) and then pressing the switch 36 (FIG. 1). The switch 36 momentarily interrupts the latched voltage signal $V_1$ causing the SCR $Q_1$ to turn off. When the SCR $Q_1$ turns off, the transistor $Q_2$ will follow (because the voltage across the emitter-base junction of transistor $Q_2$ will be less than two diode drops). The "disarmed" LED 174 will also turn off. On the other hand, the gate of the JFET 188 is pulled low which will turn on the JFET 188 (a depletion mode device) and the "armed" LED 184. The "armed" LED 184 if mounted close to the warning notice 185 (FIG. 1) can enhance the effect of the "anti-theft" warning. To "disarm" the security device 10, the key 24 is inserted (momentarily or continuously) in the receptacle 26.

Figure 5A:
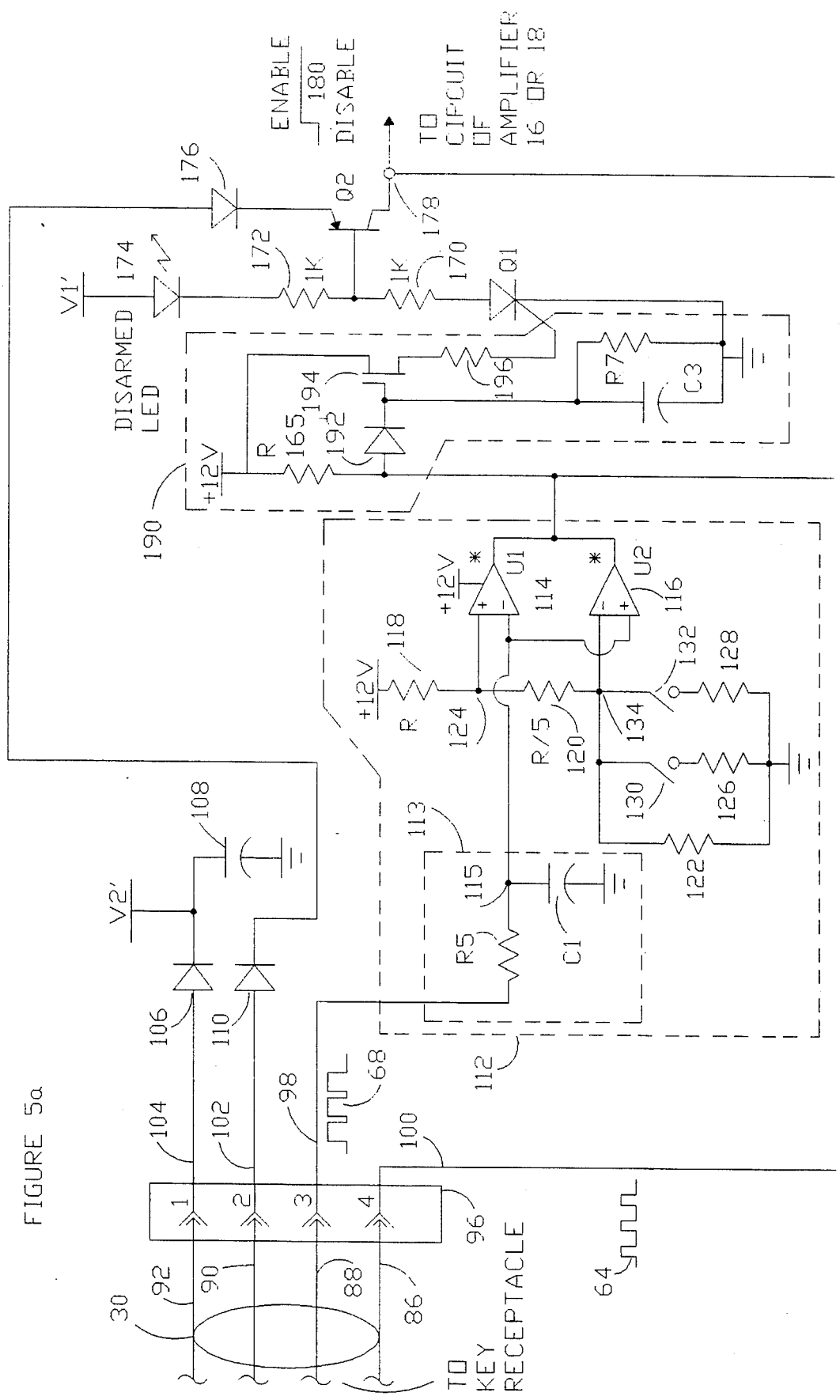
FIG. 5 is a schematic diagram showing another embodiment of a security module for the security device of FIG. 1.
Figure 5B:
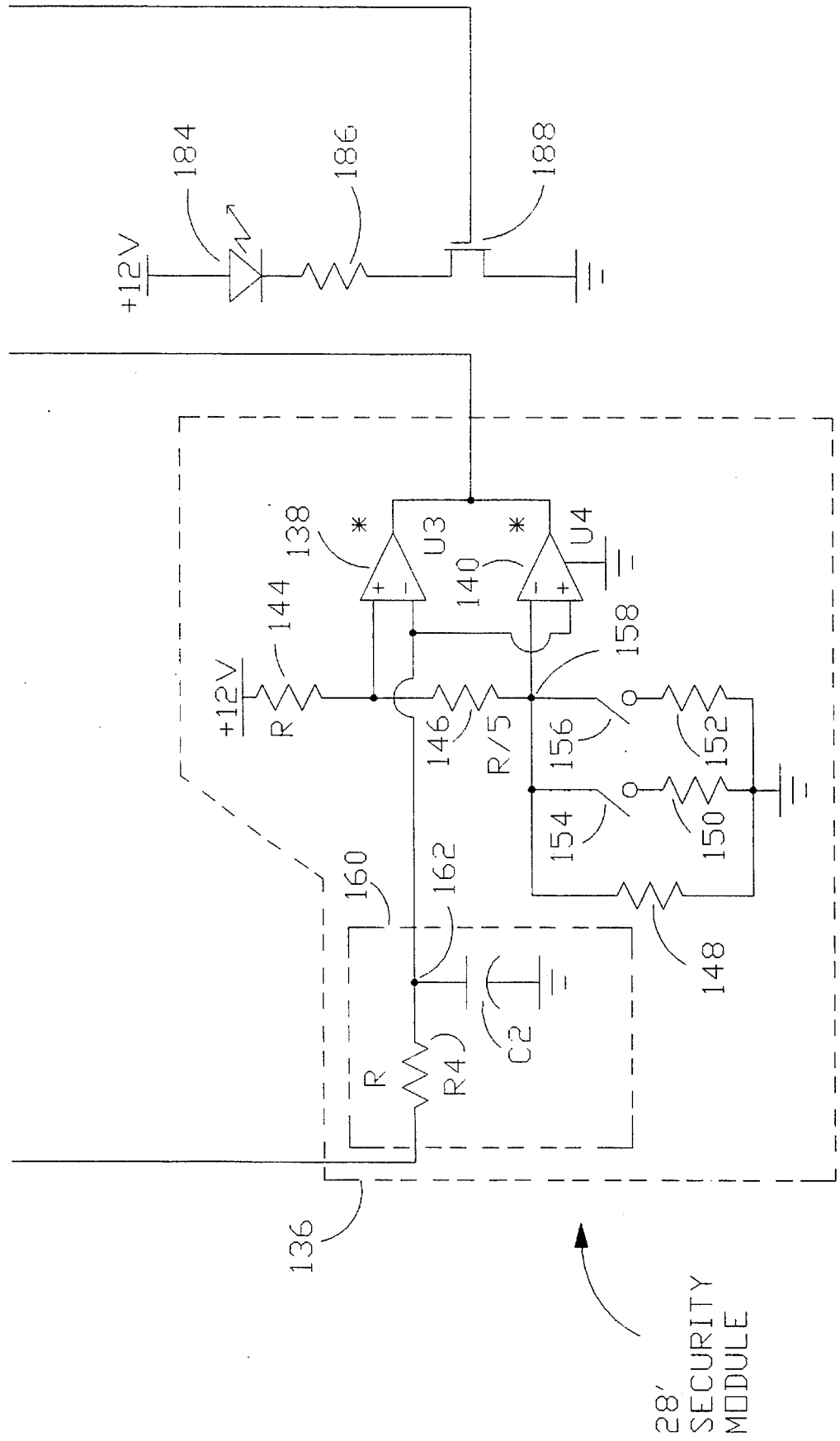

Reference is next made to FIG. 5 which is a schematic of a security module according to another embodiment of the present invention and is indicated by reference 28'. Corresponding reference numerals are used to indicate corresponding parts in FIGS. 4 and 5. The security module 28' shown in FIG. 5 is for use with the switched 12-volt feed 38 from the vehicle power supply 32. In this embodiment, the ignition switch 39 (shown with broken lines in FIG. 1 ) replaces the momentary switch 36 (FIG. 1) to produce a latched voltage signal $V_1'$ which, as will be described is used to "arm" the security device 10. A feature of this embodiment is that the security device 10 can be armed automatically before the vehicle is left unattended by simply turning off the ignition switch 39 for the vehicle.

As shown in FIG. 5, the input 104 provides a latched voltage signal $V_1'$ which is derived from the switched 12-volt power feed 38. In this embodiment, the security device 10 can be "armed" by simply turning off the ignition switch 39, for example, before the car is left unattended. When the ignition switch 39 is turned off the latched voltage signal $V_1'$ is interrupted and lost which causes the SCR $Q_1$ to turn off or unlatch, thereby turning off transistor $Q_2$ as described above.

Since it is desirable to attach the security key 24 to a key chain (not shown), the security module 28' provides a delay period for the user to turn on the ignition switch 39 after the security key 24 has been removed from the receptacle 26. To "disarm" the security device 10, the user simply inserts the key 24 into the receptacle 26 (for at least two seconds) and then using an ignition key (not shown) turns on the ignition switch 39 within 10 seconds. This allows the user to carry the security key 24 on the same key chain as the ignition key, which as will be appreciated makes the security device 10 convenient to use and therefore more likely to be used.

The delay period described above is provided by a delay circuit 190 which is coupled between the "ANDed" output 166 of the window comparators 112 and 136 and the gate input to the SCR $Q_1$. As shown in FIG. 5, the delay circuit 190 comprises the capacitor $C_3$ which is coupled to the output 166 of the window comparators 112,136 through a diode 192. The capacitor $C_3$ and cathode of the diode 192 are also coupled to the gate of a MOSFET device 194. The MOSFET 194 is coupled to the supply rail +12 V and to the gate of the SCR $Q_1$ through a resistor 196. The MOSFET 194 acts as a buffer for driving the gate of the SCR $Q_1$ and the resistor 196 provides a current limit for protection. The capacitor $C_3$ is connected to a resistor $R_7$ which discharges the capacitor $C_3$ as will be described below.

Referring still to FIG. 5, when the output 166 goes "high" (i.e. in response to valid pwm signals 64,68), the diode 192 is forward biased and the MOSFET 194 will turn on, which turns on or latches the SCR $Q_1$. In addition, the capacitor $C_3$ charges as long as the diode 192 is on. When the user removes the key 24, the output 166 will go low because the pwm signals 64,68 no longer serve as inputs to the window comparators 112,136. The diode 192 turns off and the capacitor $C_3$ will discharge through resistor $R_7$ according to the RC time constant, which is selected to be 10 seconds. When the voltage on the capacitor $C_3$ falls below the turn-on voltage, the MOSFET 194 will turn off thereby causing the SCR $Q_1$ to unlatch. With the SCR $Q_1$ unlatched, the transistor $Q_2$ cannot be turned on to enable the amplifier(s) 16 (18), even if the ignition switch 39 is turned on to provide the latched voltage $V_1'$. Therefore, once the key 24 is removed from the receptacle 26, the user has 10 seconds to turn on the ignition switch 39 to disarm the security device 10, i.e. enable the amplifiers 16,18.

The security module 28' shown in FIG. 5 can also be modified to provide an additional time period for delaying the disarming operation. To delay the disarming operation, i.e. response to inserting key 24, the components values for the capacitor $C_1$ and resistor $R_5$ comprising the RC network 113 can be selected to provide a "RC time constant" of two seconds. When the key 24 is plugged into the receptacle 26, it will take 2 seconds for the pwm signal 68 to charge the capacitor $C_1$ to the voltage level at node 115 for input to the window comparator 112.

With the 2-second delay feature described above, operation of the security device 10 is a follows. The "disarming" process is started by the user inserting the key 24 into the key receptacle 26 for at least 2 seconds. The 2-second time constant is determined by the values for resistor $R_5$ and capacitor $C_1$ in the RC network 113. After about 2 seconds, the user removes the key 24 (in order to use the ignition key (not shown)) and the user has ten seconds to activate the ignition switch 39, otherwise, the disarming procedure must be started again. (The 2-second time constant is also for use with another embodiment of the security key as will be described below with respect to FIGS. 6 and 7.)

Figure 6:
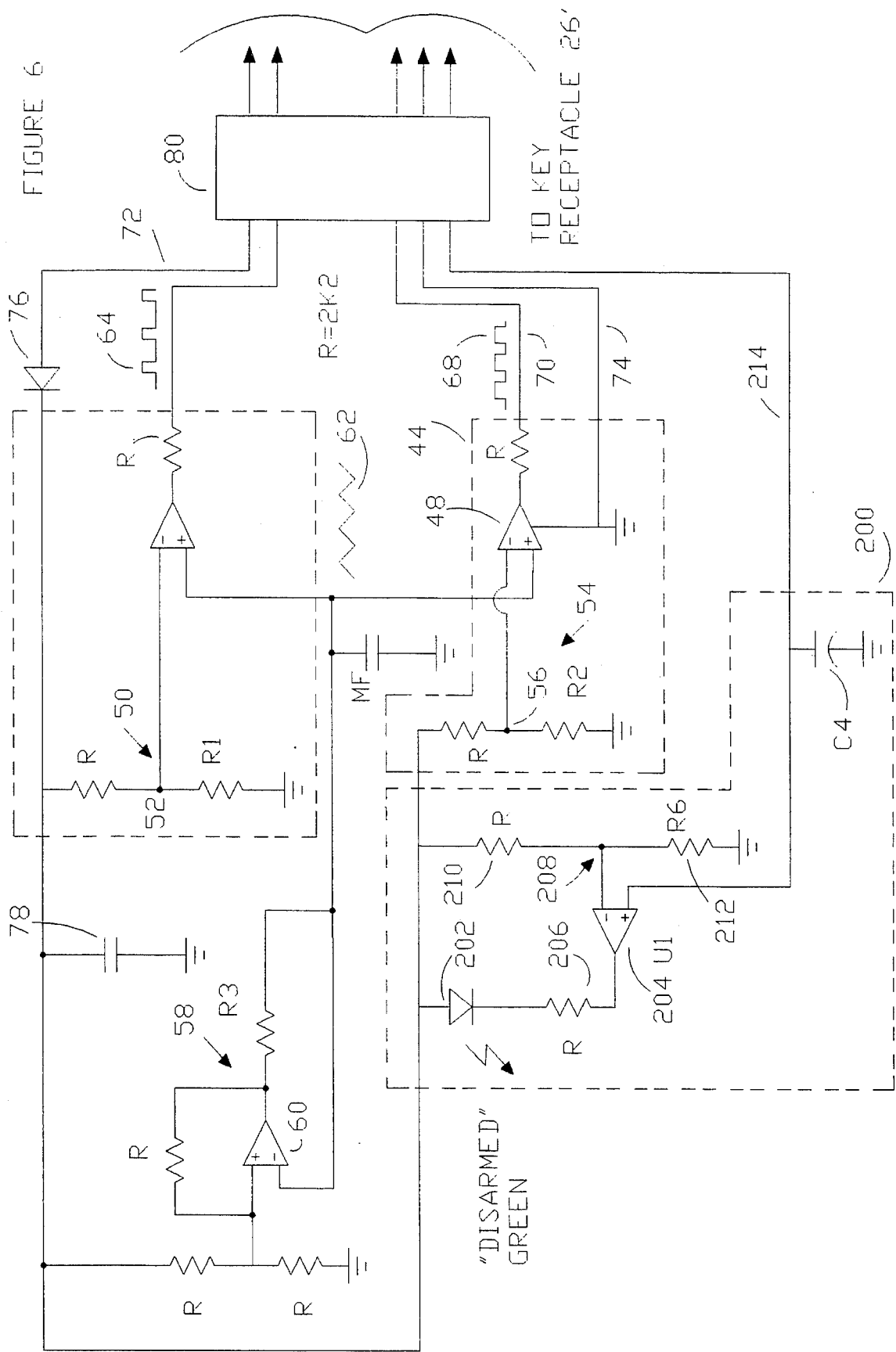
FIG. 6 is a schematic diagram showing another embodiment of a security key for the security device of FIG. 1.
Figure 7:
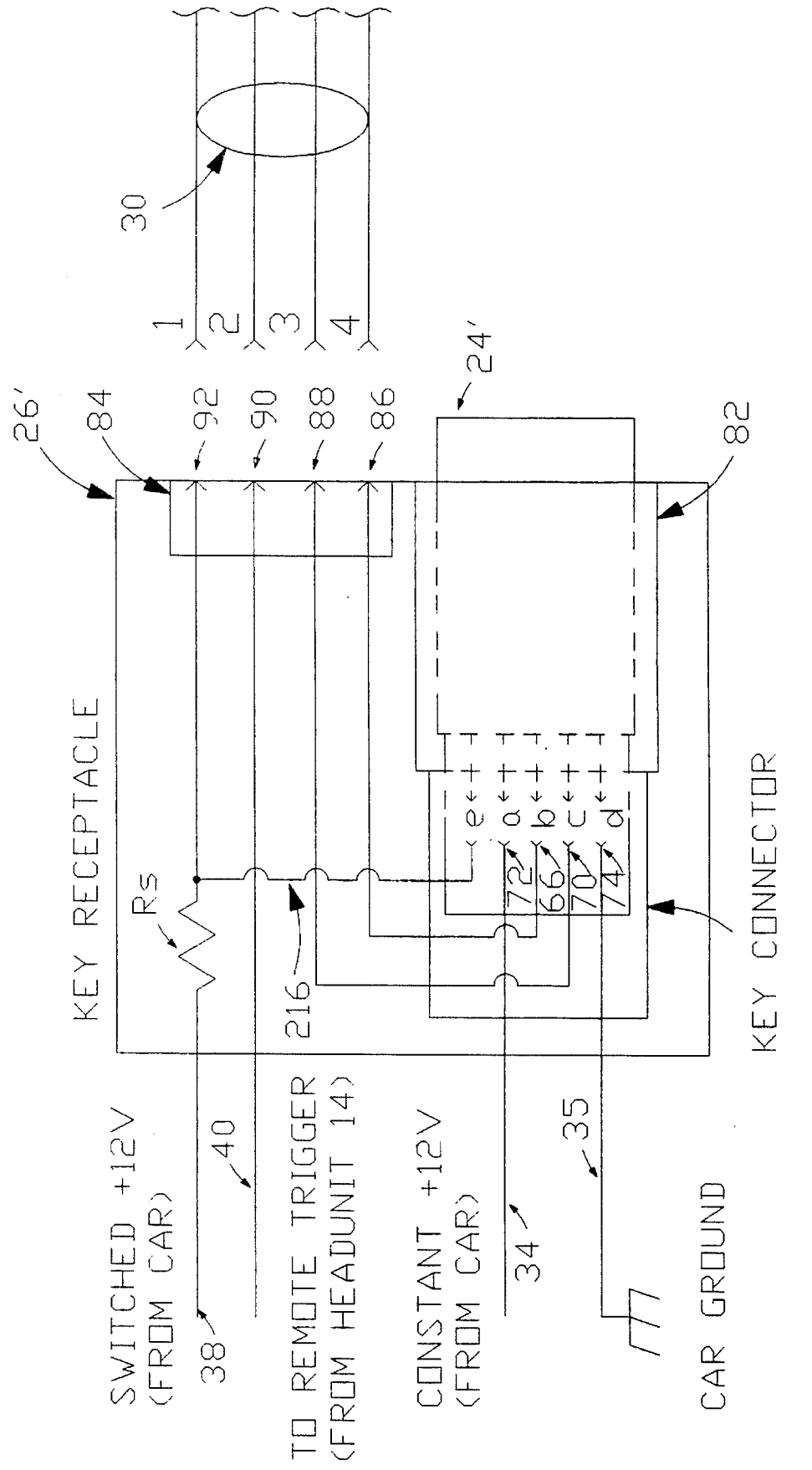
FIG. 7 is a schematic diagram showing another embodiment of the key receptacle for use with the key of FIG. 6.

Reference is next made to FIGS. 6 and 7 which show another embodiment for a security key 24' and a key receptacle 26' according to the invention. Corresponding reference numerals are used to indicate corresponding parts in FIGS. 2 to 3 and FIGS. 6 to 7. The security key 24' works in conjunction with the key receptacle 26' (FIG. 7) and features a "disarmed" green LED 202 to indicate that the security device 10 has been disarmed. Because the equipment to be protected, e.g. amplifiers 16,18, can mounted in a remote or inaccessible location of the car, the LED 202 on the key 24' can be very useful and desirable. Another feature of the key 24' shown in FIG. 6 is the capability to use it both "arm" and "disarm" the security device 10 as will now be described.

Referring to FIG. 6, the key 24', which is very similar to the key 24 depicted in FIG. 2, includes an additional circuit denoted by reference 200. This circuit 200 controls the "disarmed" LED 202 and also provides the "arm" feature. The circuit comprises the LED 202, an comparator 204 and a capacitor $C_4$. The output of the comparator 204 is coupled to the LED 202 through a resistor 206. The anode of the LED 202 is connected to the power input line 72. The LED 202 will turn on when the output of the comparator 204 is low, i.e. the voltage at the inverting input exceeds the voltage at the non-inverting input.

As shown in FIG. 6, the inverting input of the comparator 204 is connected to a resistive divider 208 comprising a resistor 210 and a resistor 212 or $R_6$. The resistive divider 208 produces a voltage reference at the inverting input which is compared to a voltage signal appearing at the non-inverting input. The non-inverting input of the comparator 204 is coupled to the capacitor $C_4$. The function of the capacitor $C_4$ is to produce the voltage signal at the non-inverting input of the comparator 204. The capacitor $C_4$ is coupled to an additional input line 214 on the connector 80. The input line 214 is used to charge the capacitor $C_4$. As shown in FIG. 7, the input line 214 is coupled to an additional output line 216 when the key 24' is plugged into the slot 82 in the key receptacle 26'. The output line 216 is coupled to the switched power feed 34 in the receptacle 26' which as shown now includes a resistor $R_s$.

Referring still to FIGS. 6 and 7, to manually arm the security device, the key 24' is inserted into the receptacle 26' for less than 2 seconds (i.e. the time constant for the RC network 113). When the key 24' is inserted, the capacitor $C_4$ causes the latch voltage $V_1$ (or $V_1'$, if the ignition switch 39 is on) to temporarily drop as the capacitor $C_4$ charges through the path defined by line 216 and line 92. A drop in the latch voltage $V_1$ causes the SCR $Q_1$ to unlatch which disables the amplifier 16 as will now be apparent to one skilled in the art.

If the key 24' is left in the receptacle 26' for more than 2 seconds, then the pwm signal 68 will have charged the capacitor $C_1$ to a voltage level sufficient to activate the window comparator 112. Assuming the other window comparator 136 has detected a valid pwm signal 64, the output 166 goes high, the SCR $Q_1$ latches and the amplifier 16 is enabled for the security module 28 of FIG. 4. If the key 24' is being used with the security module 28' of FIG. 5, then the user has 10 seconds within which to turn on the ignition switch 39 (if not already done so) to allow the SCR $Q_1$ to latch and thereby enable the amplifier 16. It will be remembered that the 10 second delay is established by the capacitor $C_3$ and the resistor $R_7$.

Referring back to FIG. 6, the operation of the "disarmed" LED 202 can be explained as follows. The security device 10 is disarmed when the SCR $Q_1$ is latched, and when the SCR $Q_1$ is latched, a current will flow through resistor $R_s$ (FIG. 7). The current flowing in resistor $R_s$ will also discharge the capacitor $C_4$ causing a drop in the voltage signal at the non-inverting input of the comparator 204. When the voltage at the non-inverting input drops below the voltage level at the inverting input, the output of the comparator 204 will go low causing the LED 202 to turn on. The LED 202 remains on until the key 24' is unplugged or the SCR $Q_1$ is unlatched.

Figure 8:
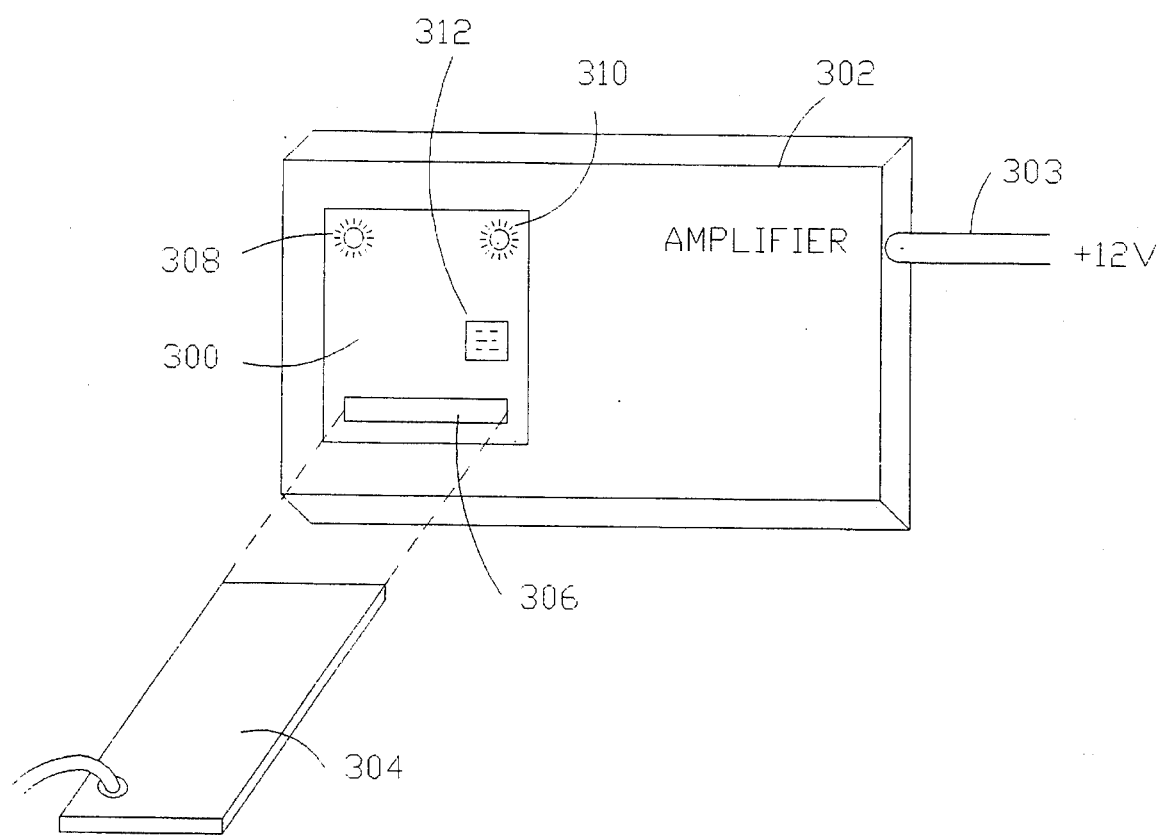
FIG. 8 is a block diagram of another embodiment of a security device according to the present invention.

Reference is next made to FIG. 8 which shows another embodiment of a security device 300 according to the invention. In this embodiment, the security device 300 comprises a key receptacle and security module which are integral with the equipment to be protected, e.g. a power amplifier 302. In known manner, the amplifier 302 is connected to a power feed 303, for example, constant +12 volts in a car audio application. As shown in FIG. 8, a security key 304 is plugged directly into a key receptacle 306 on the amplifier 302. The module 300 includes a "disarmed" LED 308 and an "armed" LED 310. The module 300 can also include an "anti-theft" warning notice 312. The security key 304 and receptacle and module 300 can be implemented as described above (see FIGS. 2, 3 and 4 for example).

In this embodiment, the security device 300 establishes an "anti-theft" or "armed" condition whenever the amplifier 302 is disconnected from the power feed 303. Removal of power 303 causes the SCR $Q_1$ to unlatch and the amplifier 302 will be disabled (as described above). Therefore, whenever the equipment 302 has been disconnected from the +12 V power connection, the key 304 must be plugged in to remove the "anti-theft" condition and thereby enable operation of the amplifier 302. In this embodiment, the SCR (see above) will stay latched until the +12 V power connection 303 is removed. It will apparent that this will always happen when the amplifier 302 (or other product) is removed from the vehicle. In other words, the security device 300 shown in FIG. 8 is "armed" automatically when the amplifier 302 is disconnected from the +12 V power feed 303, and the key 304 must be used to "disarm" the security device 300 and enable the amplifier 302. Therefore, there is very little economic value for an amplifier 302 without the security key 304.

Figure 9:
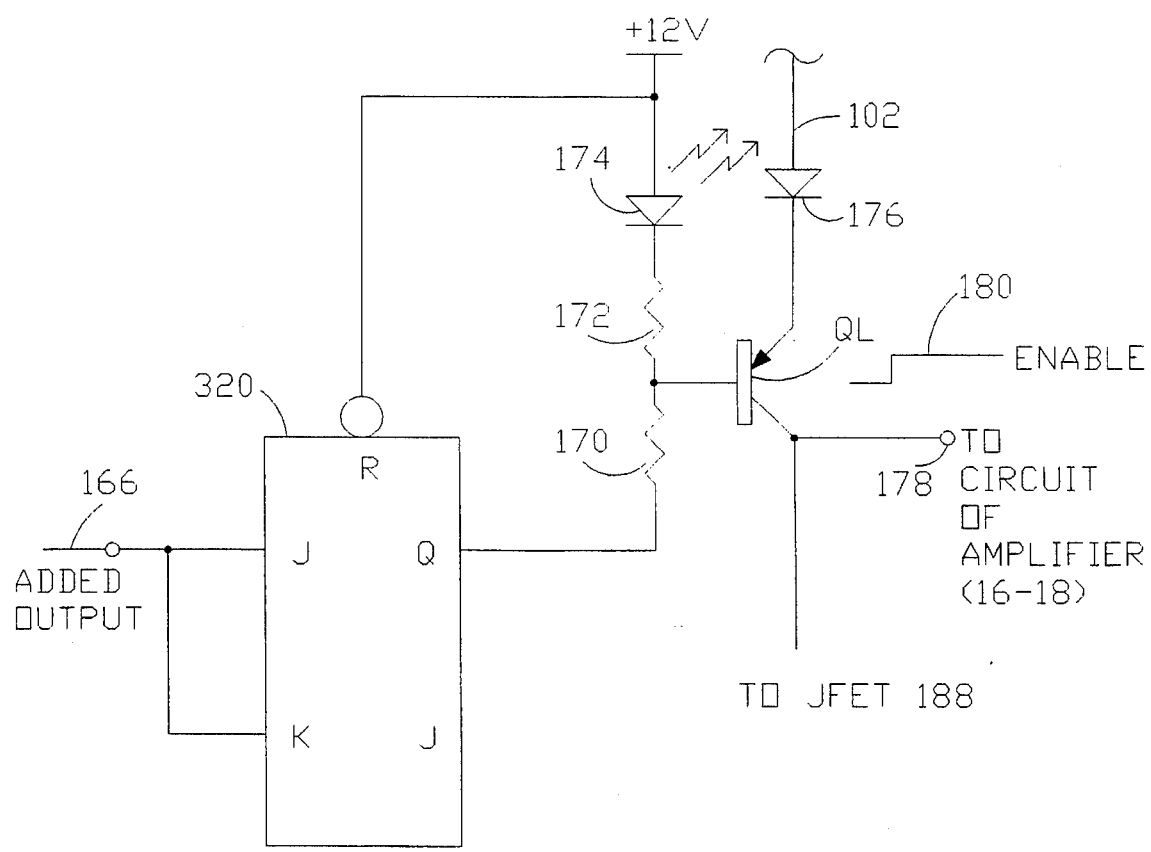
FIG. 9 is a schematic diagram showing another embodiment of a security module according to the invention.

Reference is next made to FIG. 9 which shows another embodiment of the output stage 190 and SCR $Q_1$ for the security module 28' (and security module 28 with modifications). As shown in FIG. 9, the output stage 190 and SCR $Q_1$ is replaced by a J-K flip-flop 320. The J-K flip-flop 320 is configured as a "toggle" flip-flop by tying the "J" and "K" inputs together. The tied "J" an "K" inputs are connected to the "ANDed" output 166 from the window comparators 112,136 (FIG. 5). The reset input of the J-K flip-flop 320 can be tied directly (or through a capacitor (not shown)) to the supply rail +12 V as shown in FIG. 9.

In operation, each time the key 24 (or 24') is plugged into the key receptacle 26 (or 26'), the ANDed output 166 goes high. The high output 166 causes the output $Q_o$ of the flip-flop to toggle thereby causing the enable output 180 to also toggle between the enabled and disabled states. In this embodiment, the device 10 will remain disarmed until the key 24 is again inserted or the module 28 is disconnected from the constant +12 V power connection 34 (FIG. 1), which would be the case if the amplifier 16 or 18 was stolen. This feature is desirable for those users who do not wish to be bothered with disarming the device 10 every time the ignition switch 39 has been turned off.

While preferred embodiments have been described, it will be appreciated that various modifications can be made and are within the scope of the appended claims. For example, while a pulse modulation technique for encoding the security key has been described, other encoding techniques may be used, such as direct sensing of resistive elements, direct sensing of complex impedance elements (e.g. capacitive and/or inductive elements), direct sensing of non-linear elements, or a combination of these aforementioned elements. In addition, the security key can include a tone or frequency encoded signal, a phase encoded signal or a digitally encoded signal, for example.

What is claimed is:

1. A security device for use with audio and visual equipment mounted in a vehicle, said equipment having a head unit mounted in a passenger compartment of said vehicle so that said head unit is readily accessible to a user of the vehicle, said equipment having a further component mounted in a location, such as a trunk or under a seat of the vehicle, which is not readily accessible to said user at the time when said user is driving the vehicle but is accessible by a thief for removal of said component, said security device comprising:

(a) securing means located within said component and having means connected to said component for disabling operation of said component;
    (b) security control means for disarming said securing means and enabling operation of the component, said security control means being located in said passenger compartment and accessible to said user during use of said head unit and therefore being remote from said securing means;
    (c) said security control means including a key and a key receptor, said key being removable and replaceable in conjunction with said receptor and said key having circuit means for producing an encoded security signal at said receptor, said security signal being a pulsed signal having a plurality of highs and lows and a plurality of transitions between said highs and lows,
    (d) said securing means including decoding means for reading and responding to said encoded security signal for enabling operation of said component; and
    (e) connecting means for connecting said security control means to said securing means.

2. The security device as claimed in claim 1, wherein said securing means includes visible warning means for providing a deterrent to theft of the components.

3. The security device as claimed in claim 2, wherein said visible warning means comprises an anti-theft notice panel associated with the components to be protected.

4. The security device as claimed in claim 3, wherein said anti-theft notice panel is attached to the components to be protected.

5. The security device as claimed in claim 4, wherein said visible warning means includes an illuminated indicator mounted proximate to said anti-theft notice panel.

6. The security device as claimed in claim 5, wherein the equipment comprises an audio system and said component comprises one or more power amplifiers mounted in said remote location in said vehicle.

7. The security device as claimed in claim 1, wherein said circuit means comprises a signal generator having means for generating said encoded security signal.

8. The security device as claimed in claim 7, wherein said signal generator comprises a pulse width modulator and said encoded security signal comprises a pulse width modulated signal having a predetermined duty cycle.

9. The security device as claimed in claim 8, wherein said circuit means includes means for programming the duty cycle of said encoded security signal.

10. The security device as claimed in claim 1, wherein said securing means includes means responsive to turning on of an ignition switch in, said vehicle for disarming said securing means provided that said encoded security signal has been received within a predetermined time prior thereto, to enable the user to operate said securing means to send said security signal, and then to turn on said ignition switch.

11. The security device according to claim 1 and for use with a power supply wherein said securing means includes means responsive to an interruption in the power supply for thereupon activating said means for disabling.

12. The security device as claimed in claim 1 or 2, wherein said key includes indicating means for indicating when said securing means is disarmed.

13. The security device as claimed in claim 1 or 11, wherein said securing means includes toggling means responsive to said security control means for alternately enabling and disabling said component each time said key is placed in conjunction with said receptor.

* * * * *